United States Patent
Kita et al.

[11] Patent Number: 5,892,680
[45] Date of Patent: Apr. 6, 1999

[54] METHOD OF CORRECTING POSITIONAL DISPLACEMENT OF MACHINING POINT

[75] Inventors: Yuki Kita; Yushi Takayama; Yuji Tsuboguchi, all of Oshino-mura, Japan

[73] Assignee: Fanuc, Ltd, Yamanashi, Japan

[21] Appl. No.: 875,994

[22] PCT Filed: Dec. 12, 1996

[86] PCT No.: PCT/JP96/03632

§ 371 Date: Aug. 11, 1997

§ 102(e) Date: Aug. 11, 1997

[87] PCT Pub. No.: WO97/22041

PCT Pub. Date: Jun. 19, 1997

[30] Foreign Application Priority Data

Dec. 13, 1995 [JP] Japan .................................. 7-346314

[51] Int. Cl.$^6$ .................................................. G05B 19/18
[52] U.S. Cl. .................................. 364/474.04; 219/69.17; 364/474.35
[58] Field of Search ............................ 364/474.01, 474.02, 364/474.04, 474.12, 474.15, 474.28, 474.29, 474.3, 474.35, 167.02, 167.07, 167.09; 219/69.12, 69.17, 69.19, 69.16

[56] References Cited

U.S. PATENT DOCUMENTS 4,567,342  1/1986  Nozawa ..................... 364/474.04 X
5,324,908  6/1994  Masuda et al. ................ 219/69.12
5,514,941  5/1996  Kita ........................ 364/474.16 X

FOREIGN PATENT DOCUMENTS 7-266190  10/1995  Japan .
8-152910   6/1996  Japan .

*Primary Examiner*—Joseph Ruggiero
*Attorney, Agent, or Firm*—Staas & Halsey

[57] ABSTRACT

There are determined by measurements: the maximum −A of the positional displacement, which is caused by a deflection when a machining point is moved in a +X direction; and a movement command D in effect until the machining point is reversed to a −X direction while the maximum deflection −A is maintained and the deflection A in the reverse direction is produced. It is assumed that the deflection proportionally changes from −A to +A while the movement command is outputted by D, that is, while the actual position of the machining point is moved by (D−2A). The correction amount is determined on the bases of the proportion of two times the deflection A with respect to (D−2A) and the movement command value after the reversal of the moving direction, and is added to the movement command value so that the resultant sum is outputted as the movement command value.

11 Claims, 8 Drawing Sheets

5,892,680

METHOD OF CORRECTING POSITIONAL DISPLACEMENT OF MACHINING POINT

TECHNICAL FIELD

The present invention relates to a method for correcting a discrepancy, as caused by the deflection of a machine, between the commanded position and the actual position of a machining point.

BACKGROUND TECHNIQUE

When a delay of action occurs by the deflection of a machine, between the drive point and the machining point of a driven member to which the force from a drive source is applied, there arises a problem that an inconsistency or action occurs between the machining point, as commanded by a control system, and the actual machining point. This positional displacement due to the deflection is conspicuous in an industrial machine having a distance between the drive point and the machining point, such as a wire electric discharge machine.

Therefore, a representative example of the electric wire electric discharge machine is schematically shown in FIG. 1. The components of this wire electric discharge machine not described with reference numerals are omitted from FIG. 1.

A column 2, fixed on the bed 1 of the wire electric discharge machine, has UV axes and Z axis 3 fixed on its upper end and an arm for supporting a lower wire guide fixed on its intermediate portion. The arm extends through an arm cover 4 which is fixed on the column 2. On the bed 1, there is mounted a cross table 5, which can be moved in the directions of X- and Y-axes. On the cross table 5, there are mounted a work carriage and a machining bath 6 for dipping the workpiece. Between the upper wire guide, disposed at the leading end of the Z-axis, and the lower wire guide, disposed at the leading end of the arm, there is a wire electrode 7 extended for performing the electric discharge machining.

The arm, integrally fixed to the column 2, is extended passing through the arm cover 4 into the machining bath 6, and the workpiece, fixed on the workpiece carriage mounted on the machining bath 6 and the cross table 5, is movable relative to the arm, so that it is necessary to ensure that the machining liquid can be prevented from leaking at the joint between the arm and the machining bath 6 during the aforementioned relative movements.

The cross table 5, the machining bath 6 and the workpiece are moved in the X-Y plane by driving and controlling an X-axis driving servo motor Mx and a Y-axis driving servo motor My through servo control circuits 12 and 13 of a control system 11.

The wire electric discharge machine body is provided with a jet nozzle at the leading end of the Z-axis, a machining liquid circulator for supplying the machining liquid to the machining bath 6, various motors for feeding the wire, and a discharge machining power source for applying the machining voltage to the wire electrode 7. These equipments are individually driven and controlled by the control system 11 through a machining liquid control circuit 14, a wire control circuit 15 and a discharge control circuit 16.

The control system 11 is provided with a CPU 19 for the CNC to drive and control the individual axes of the discharge machining apparatus on the basis of the system program, as stored in a ROM 17, and a machining program, as stored in a RAM 18. The CNC CPU 19 is connected with the aforementioned servo control circuits 12 and 13 through a bus 20. The CNC CPU 19 outputs distributed pulses to the servo control circuits 12 and 13 for the individual axes to drive the servo motors of individual axes, move the cross table 5, and establish the discharge for the machining between the face of the workpiece, as carried on the workpiece carriage of the machining bath 6, and the wire electrode 7.

A CPU 21 for the PMC drives and controls the discharge control circuit 16, the wire control circuit 15 and the machining liquid control circuit 14 in accordance with the system program, stored in the ROM 17, and the power supply conditions and the machining conditions stored in the RAM 18.

The CNC CPU 19 is connected through a display control circuit 22 to a manual data input unit 23 with a display, so that the machining program and the power supply and machining conditions can be manually inputted. Furthermore, the machining route and the setting conditions can be monitored in the display screen of the manual data input unit 23.

With reference to the schematic diagram of FIG. 2, here will be described the detail of the joint portion between the arm cover 4 and the machining bath 6 in the electric wire electric discharge machine of FIG. 1. Incidentally, the components of the joint portion not denoted with reference numerals are omitted from FIG. 2.

On the back of the machining bath 6, there is mounted a seal plate 9, which is provided with a flange 8 for fixing the arm cover 4. This seal plate 9 is fitted to the back of the machining bath 6 by being pressed thereto with a number of bearings 10 so as to stop the hole, which is formed in the back of the machining bath 6 and extends in the X direction. A seal base is mounted on the outer circumference of the hole to prevent the leakage of the machining liquid from around the seal plate 9. On the inner circumference of the flange 8, there is fitted a V-packing for preventing the leakage of the machining liquid from around the arm extending therethrough.

As a result, when the cross table 5 is driven to move the machining bath 6 and the workpiece, especially when the machining bath 6 is moved in the X-axis direction, the seal plate 9, pressed to be fitted against the machining bath 6, will be dragged to move together with the machining bath 6 by the sliding resistance acting therebetween. Thus, a bending moment in the X-axis direction occurs to cause a deflection in the transmission mechanism, comprising the cross table 5 and the ball screws/nuts for driving the cross table 5, and in the joint between the transmission mechanism and the cross table 5 (hereinafter referred to together as the "workpiece drive unit"), so that the actual machining point delays from the commanded machining point. In this case,. the machining point is a position where the workpiece and the wire electrode 7 confront each other.

It is assumed, for example, that no external force in the X-axis direction is exerted upon the workpiece drive unit when the machining point commanded by the control system is located at $(x, y)=(x1, y1)$, and that a command is given to move the wire electrode 7 from this state to the position $(X, Y)=(x1+a, y1)$ $(a>0)$ (although the actual movement is made by the cross table 5).

In such a case, the aforementioned deflection occurs in the workpiece drive unit, causing the workpiece on the workpiece carriage of the cross table 5 to make a delayed movement. If the positional displacement due to this deflection is given as Ca' (Ca'>0), the actual machining point is located at (x, y)=(x1+a−Ca', y1) so that the delay of Ca' occurs from the commanded machining point (x, y)=(x1+a, y1). The maximum A of this delay Ca' is dependent on the magnitude of the sliding resistance between the machining bath 6 and the seal plate 9 and by the rigidity and span of the individual members of the workpiece drive unit, and will not exceed the delay Ca' no matter how far the machining point is moved.

In other words, while the force to be applied in the +X direction from the machining bath 6 to the seal plate 9 is lower than the sliding resistance between the seal plate 9 and the machining bath 9, the seal plate 9 moves together with the machining oath 6 to increase the deflection Ca' of the workpiece drive unit in the −X direction. However, when the deflection of the workpiece drive unit increases until the reaction in the +X direction exceeds the sliding resistance between the seal plate 9 and the machining bath 6, a slip occurs between the seal plate 9 and the machining bath 6 to allow only the machining bath 6 to move. In short, the value of the deflection Ca' corresponding to the reaction, as acting in the +X direction when the slip occurs, takes the maximum value A.

As the correction method for correcting the positional displacement of a machine, there is known the pitch error correction for correcting the positional displacement caused by the pitch error of the feed screw, or the backlash correction for correcting the play of the power transmission mechanism occurring at the time of reversed movement of a driven member. However, neither of these methods can be applied to the correction of the positional displacement which is caused by the deflection.

More particularly, the pitch error correction determines the correction amount univocally according to the present position (i.e., the present position of the driven member with respect to the feed screw) of the driven member such as the cross table 5 in the mechanical coordinate system, so that it cannot cope with the mechanical deflection varying according to the moving distance after the reversal when the movement of the driven member is reversed at an indefinite position. On the other hand, the backlash correction for outputting, when reversing the movement of the driven member, the amount of correction for eliminating the play to be caused at the time of the change of the rotational direction of the gears or the like cannot cope with the deflection which gradually varies with the moving distance from the position at which the movement is reversed.

In short, there has never been proposed the correction method for eliminating the positional displacement caused by the deflection of the machine.

SUMMARY OF THE INVENTION

An object of the present invention is to provide a method for correcting positional displacement of machine point, capable of solving the aforementioned problems of the prior art by effectively correcting the positional displacement of a machining point due to deflection of the machine, to move the machining point to the commanded position.

In order to achieve the above object, according to one aspect of the present invention, in a machine where a delay of action is caused by a mechanical deflection between a drive point and a machining point of a driven member to which the force of a drive source is applied, the maximum delay of the machining point with respect to the drive point is predetermined; a correcting path for correcting the delay in the movement of the drive point after reversing the moving direction is determined; a correction amount for correcting the delay is determined, oil the bases of both two times the maximum delay with respect to said correction path and a movement command value after the reversal of the moving direction, till the summation of the correction values reaches the maximum delay; and the determined correction value is added to the movement command value thereby to output the summation as a movement command value.

According to another aspect of the present invention, in a machine where a delay is caused by a mechanical deflection between a drive point and a machining point of a driven member to the force of a drive source is applied, the maximum delay of the machining point with respect to the drive point is predetermined; a correction path for correcting the delay in the movement of the drive point after reversing the moving direction is determined; a memory means for storing a correction value corresponding to the delay is provided; at a reversal of moving direction, a correction value is determined on the bases of a position in the determined correction path and a position in the correction path corresponding to the maximum delay and a movement command value; the difference between the correction value and the correction value, as stored in the memory means, is added to the movement command value thereby to output the resultant value as a movement command value; the determined correction value is updated and stored in the memory means; and the movement command value is directly outputted as a movement command value when the absolute value of the correction value, as stored in the memory means, become equal to the maximum delay.

Preferably, the movement path of the drive point between the point, at which its delay is at a maximum and the movement of the drive point is reversed, and the point, at which the movement of the drive point is reversed again and its delay has become a maximum, is measured, and the measured movement section is treated as the correction period.

According to the present invention, even when the deflection occurs during the movement or reversal of the machining point in the individual portions of the machine due to the loads of disturbances such as the insufficient rigidities or the sliding resistance of the components of the machine when there is a considerable distance between the drive point and the point of action, the positional displacement of the machining point due to the deflection can easily be eliminated only by processing designed for the drive control.

The method of the present invention is especially effective when applied to the wire electric discharge machining apparatus in which the deflection is apt to occur in the arm or workpiece drive unit for holding the wire electrode due to the sliding resistance caused by the movement of the machining bath. And, the method is capable of effectively correcting the positional displacement caused by the deflection, which has been unable to be eliminated by the backlash correction or the pitch error correction of the prior art, so that a round or elliptical hole can reliably be formed by reversing the moving directions of the individual axes.

Moreover, the present method dispenses with the need of increasing the rigidities of the components of the machine so that, with this method, industrial machines having an excellent positioning accuracy can be provided at low costs.

BEST MODES FOR CARRYING OUT THE INVENTION

Figure 1:
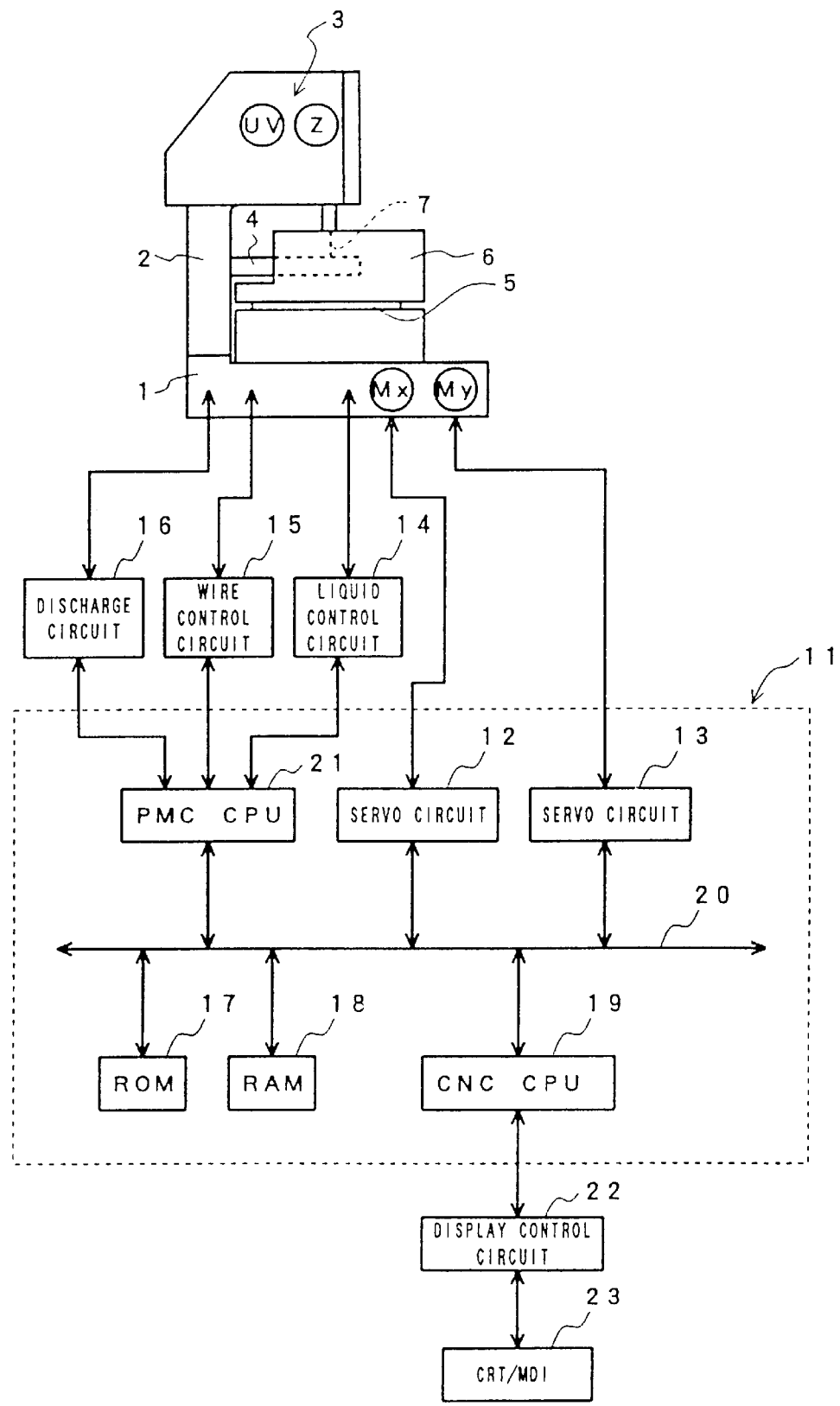
FIG. 1 is a block diagram schematically showing a wire electric discharge machine to which the method of the present invention is applied, and construction of a control system for the machine.
Figure 2:
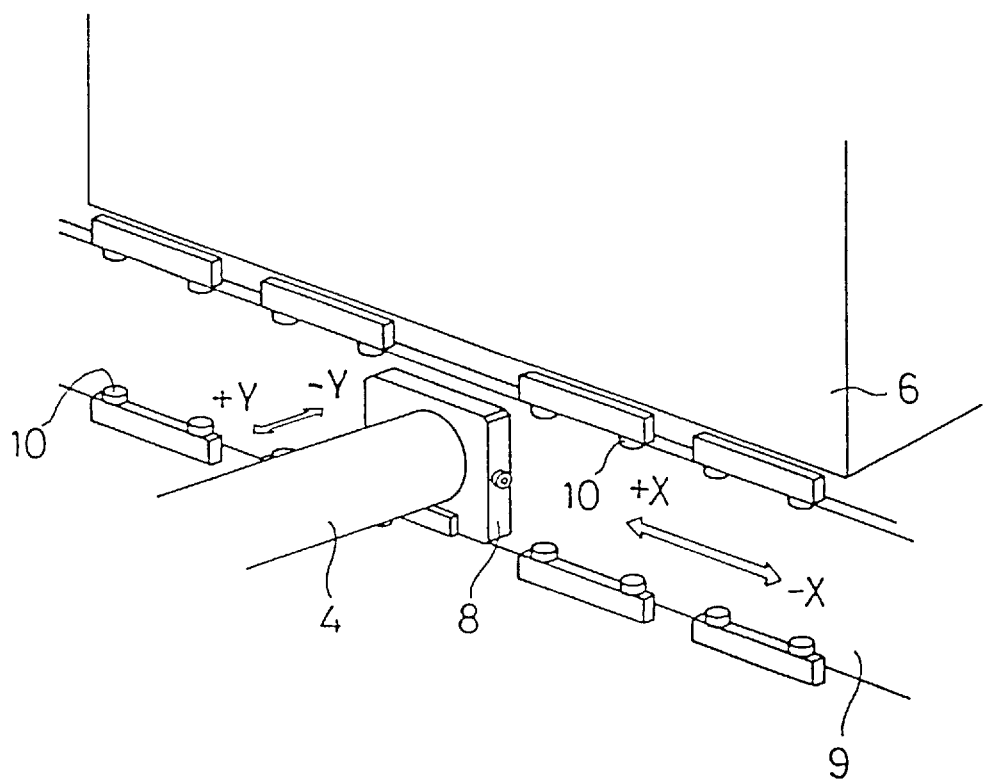
FIG. 2 is a perspective view schematically showing a jointing portion between the arm and the machining bath in the electric wire electric discharge machine, as shown in FIG. 1.

A method for correcting the positional displacement of a machining point according to the present invention will be described when it is applied to an electric wire electric discharge machine, as shown in FIGS. 1 and 2.

The principle of the positional displacement correcting method in the present embodiment will be described with reference to FIGS. 3 to 5.

Figure 3:
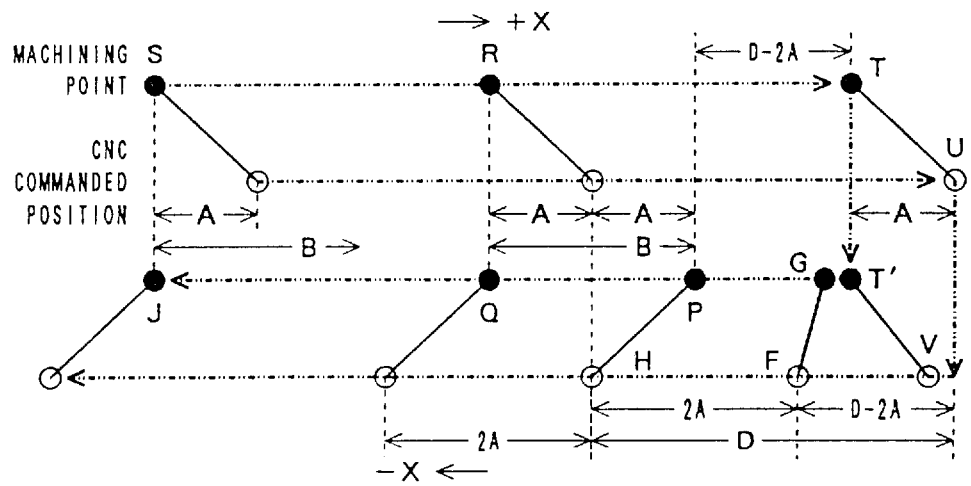
FIG. 3 is diagram for explaining the extent and direction of a positional displacement of the actual machining point caused by the deflection of the machine, in response to a movement command of the CNC.

FIG. 3 schematically illustrates the positional displacement which is caused by the deflection of a workpiece drive unit when the machining point is once moved in a direction of +X and then reversed in the direction of −X. In FIG. 3, blank circles indicate the commanded positions at which commands are given from the control system, and solid circles indicate the actual positions of machining point, that is, the positions of the wire electrode 7. At the position of a machining point S, as shown in FIG. 3, it is assumed that the workpiece drive unit has already been deflected to a maximum by the preceding movement in the +X direction thereby to cause a maximum positional displacement A between the commanded position and the machining point. It is also assumed that the pitch error correction of the feed screw for driving the cross table 5 and the backlash correction of the power transmission mechanism between the servo motor Mx and the cross table 5 are executed completely. The movement of the machining point (i.e., the wire electrode 7) in the +X direction is actually the movement of the cross table 5 in the −X direction.

The maximum value A of the positional displacement is dependent, as already described in connection with the prior art, on the magnitude of the sliding resistance between the machining bath 6 and the seal plate 9 and on the rigidity, span and the like of the workpiece drive unit. Thus, the delay Ca' of the actual position of the machining point from the commanded position will never exceed the value A no matter how far the machining point is moved from the machining point S, as shown in FIG. 3, in the +X direction. In other words, the value of the delay Ca' is always equal to the maximum A in the section from S to T existing before the machining point reaches a reversal point T.

Here, it is assumed that the moving direction of the machining point is reversed at a commanded position U (or the actual position T) from the +X direction to the −X position. In this case, the reversal of the servo motor Mx for driving on the X axis can instantly be started by the reversal of the movement command from the control system. As describe above, however, the deflection, Ca'=A, in the −X direction has already been accumulated. Therefore, even if the servo motor Mx is reversed, the deflection Ca' is only gradually eliminated at first and will not make a large difference (i.e., a movement matching the command) between the actual position T (i.e., the reversal starting position) of the machining point and the actual position T' (i.e., the position just after the reversal). In other words, there are relations such as one between the commanded position U and the actual position T and one between a commanded position V and the actual position T' as shown in FIG. 3.

As the machining point moves farther in the −X direction beginning to cause the deflection in the opposite +X direction in the workpiece drive unit, the positional displacement of the machining point from the commanded position gradually appears as the delay Ca' in the opposite direction. This positional displacement is exemplified by a relation between a commanded position F and an actual position G, as shown in FIG. 3.

Since the magnitude of the sliding resistance between the machining bath 6 and the seal plate 9 and the rigidity and span of the workpiece drive unit are always constant, even when the machining point is moved in the −X direction, the value of the positional displacement Ca' finally reaches the maximum A as in the movement in the direction +X. This is a relation between a commanded position H and an actual position P, as shown in FIG. 3. Even when the machining point is farther moved from this position in the −X direction, the positional displacement Ca' will not exceed the value A. The movement of the machining point (i.e., the wire electrode 7) in the −X direction is equivalent to the movement of the cross table 5 in the +X direction.

The amount of movement command D till the positional displacement Ca' reaches again the maximum A after the start of reversal, and the maximum A of the positional displacement Ca' have to be experimentally determined in advance.

Consequently, when the workpiece drive unit is deflected to a maximum in the −X direction to accumulate the positional displacement Ca' to the maximum A, the correctional value required for moving the machining point in the +X direction is +A [e.g., the movement section from the actual position S to the actual position T (the commanded position U) FIG. 3] with respect to the commanded position. On the other hand, when the workpiece drive unit is deflected to a maximum in the +X direction to accumulate the positional displacement Ca' to the maximum A, the correction value, as required for moving the machining point in the −X direction is −A [e.g., the movement section from the actual position P (the commanded position H) to the actual position J with respect to the commanded position].

Therefore, under the condition shown in FIG. 3, assuming that the delay Ca' due to the deflection in the reversed movement section from the actual position T (the commanded position U) to the actual position P (the commanded position H) changes from −A to +A in proportion to the movement command (the movement of the servo motor Mx), when the moving direction of the machining point is reversed from the +X direction to the −X direction in the state where the workpiece drive unit is deflected to a maximum in the −X direction to accumulate the positional displacement Ca' to the maximum A, that is, in the state where the correction is made by adding the correction value +A to the commanded position thereby to effect the movement in the +X direction, the correction value −2A may be outputted while the machining point is being actually moved from the actual position T to the actual position P in this reversed movement section, that is, while the backward positional displacement is accumulated to A after the start of the reversal.

In other words, as exemplified in FIG. 3, when the correction value is outputted by −2A while the distributed pulses after the reversal, based upon the machining program, are outputted by −(D−2A), the amount of distributed pulses to be actually outputted is −(D−2A)−2A=−D (corresponding to the section of U to H), and the real movement at this time is −(D−A) [corresponding to the section of T to P], so that a complete coincidence is achieved between the movement command of −(D−2A) by the distributed pulses after the reversal, based upon the machining program, and the real movement of −(D−2A) of the machining point.

Contrary to the above, when the moving direction of the machining point is reversed from the −X direction to the +X direction in the state where the workpiece drive unit is deflected to a maximum in the +X direction to accumulate the positional displacement Ca' to the maximum A, that is, in the state where the correction is made by adding the correction value −A to the commanded position, the correction value +2A may be outputted while the machining point is moved by (D−2A), an actual amount of movement.

Figure 4:
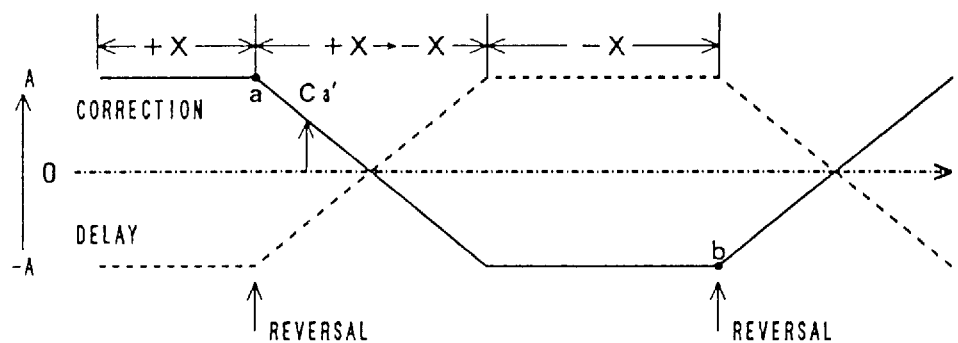
FIG. 4 is a diagram illustrating a relation between the positional displacement and a corrected value in response to a movement command when this command contains a reversal command.

FIG. 4 shows a relation between the correction value (by a solid line) and a delay (by a broken line) is illustrated for each of the case where the moving direction of the machining point is reversed from +X to −X in the state where the correction is made by adding the correction value A to the commanded position against the maximum deflection of the workpiece drive unit in the −X direction, and the case where the moving direction of the machining point is reversed from −X to +X in the state where the correction is made by adding the correction value −A to the commanded position against the maximum deflection of the workpiece drive unit in the +X direction. As shown in FIG. 4, if it is assumed that the delay changed from −A to +A in proportion to the movement command, the sum of the delay, −A to +A, and the correction value +A to −A, is always zero so that the actual position of the machining point always coincides with the commanded position.

Figure 6:
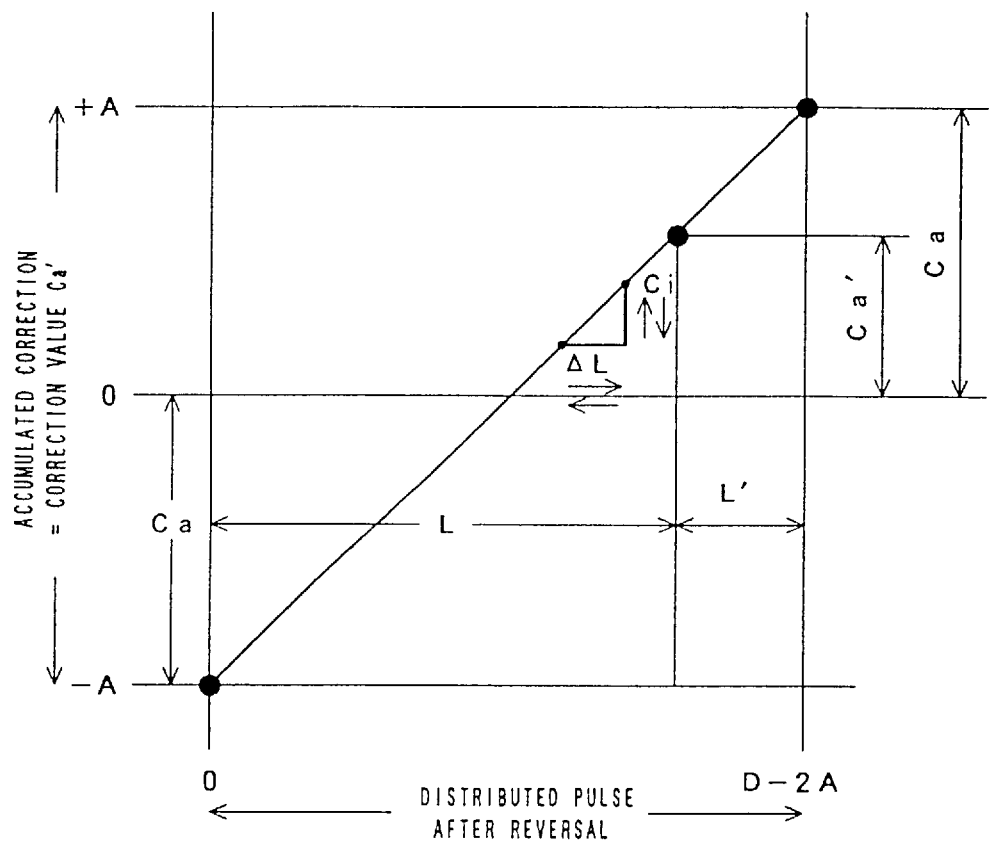
FIG. 6 is a diagram illustrating a relation between the movement command for the movement after the reversal and the correction to be made to the movement command.

Here, FIG. 6 shows a relation between the commanded end position of movement and the correction value Ca' by setting the correction value, corresponding to the commanded end position of movement after the reversal, to Ca'. FIG. 6 illustrates the accumulated correction (or the correction value Ca') as to the correctional section (D−2A), where the number of the subsequent distributed pulses after the reversal is L, by setting the distributed pulse number to "0" when the moving direction of the machining point is reversed from −X to +X in the state where the correction is made by adding the correction −A to the commanded position against the maximum deflection of the workpiece drive unit at the time of movement of tie machining point in the −X direction. Therefore, if it is assumed that the initial value Ca of the correction value Ca' at the reversal from −X to +X is −A (at the start of the reversal), and that the amount of movement (or the distributed pulse number) in the +X direction with reference to the start position of the reversal is L (L>0) and located in one of the correction sections 0 to (D−2A), the correction value Ca', required when the correction section is located at L, is expressed by the following Formula, as apparent from FIG. 6:

$$Ca' = 2A \cdot [L/(D-2A)] - A \qquad (1)$$

This means that at the start of the reversal, Ca'=2A·0−A=−A for L=0, and that at the position at which the position L of the correction section is L=(D−2A) to end the correction, that is, where the value of the abscissa in FIG. 6 is (D−2A), Ca'=2A−A=A. As described above, the correction in which the absolute value of the correction value Ca' exceeds A is not necessary, and the correction value ±A is held as it is. Incidentally, at the instant when the position L, of the correction section is L=(D−2)/2, Ca'=2A·(½)−A=0, that is, the correction value Ca' takes the value 0.

On the other hand, the initial value of the correction value Ca' is +A (at the start of reversal), when the moving direction of the machining point is reversed, from +X to −X in the state where the correction is made by adding the correction value +A to the commanded position, against the maximum deflection of the workpiece drive unit in the −X direction. If the movement in the −X direction with reference to the position, at Which the reversal is started, is L'(L'<0), and if the correction required for the movement L' is Ca', L=D−2A+L'. Hence, from Formula (1), $$Ca' = 2A \cdot [((D - 2A + L')/(D - 2A)] - A \qquad (2)$$
$$= 2A \cdot [L'/(D - 2A)] + A$$

At the start of the reversal, at which the abscissa value L becomes (D−2A) as in FIG. 6, Ca'=2A·0+A=A where the movements L' and L after the reversal can be given as L'=0 and L=D−2A, and, Ca'=2A·0−A=−A where the movements L and L" after the start of reversal can be given as L'=(D−2A) and L=0. That is, the position L of the correction section is held at (D−2A) after the correction value Ca' took +A, and at "0" after the correction value Ca' took −A. When the reversal is started, the correction value Ca' may be determined by adding the movement L' to the position L to determine the position L of the correction section. Thus, the correction value Ca' can be determined by the movements L and L' after the reversal. Furthermore, Ca'=−2A·(½)+A=0, and the correction value Ca' taxes the value 0, at the instant when the movement L' after the start of reversal is L'=−(D−2A)/2.

Figure 5:
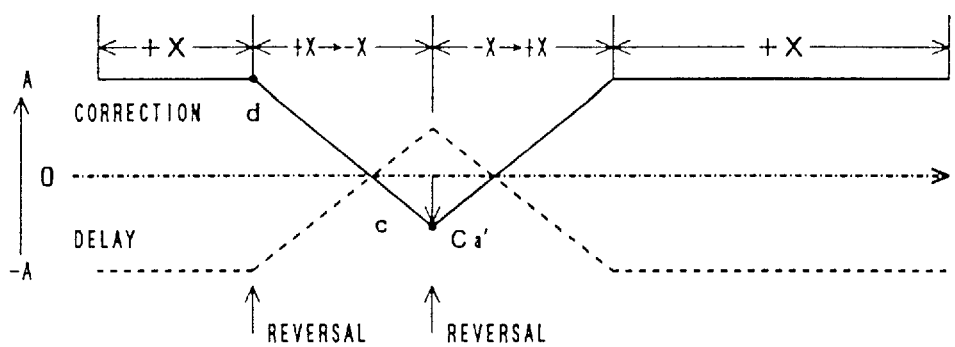
FIG. 5 is a diagram illustrating a relation between the positional displacement and a corrected value in response to the movement command when this command contains the reversal command and when the reversing command is received again after a slight movement from the start of the reversal.

As illustrated in FIG. 5, the condition will remain so that the correction value Ca' may be detected according to the foregoing Formula (1), even when the machining point is reversed again, in the stage before the correction value Ca' reaches A or −A after the execution of the reversal, that is, in the stage before the maximum deflection in the backward direction is accumulated in the workpiece drive unit.

For example, as shown in FIG. 5, it is assumed that the moving direction of the machining point is reversed again from −X to +X before the correction value Ca' reaches the value −A while the correction processing to be performed at the first reversal of the movement from +X to −X, is made according to Formula (1). In this case, too, the correction value Ca' can be determined by the Formula (1) from the position L of the correction section ranging from 0 to (D−2A) in which the point of the correction value Ca'=Ca=−A is at "0".

Figure 7:
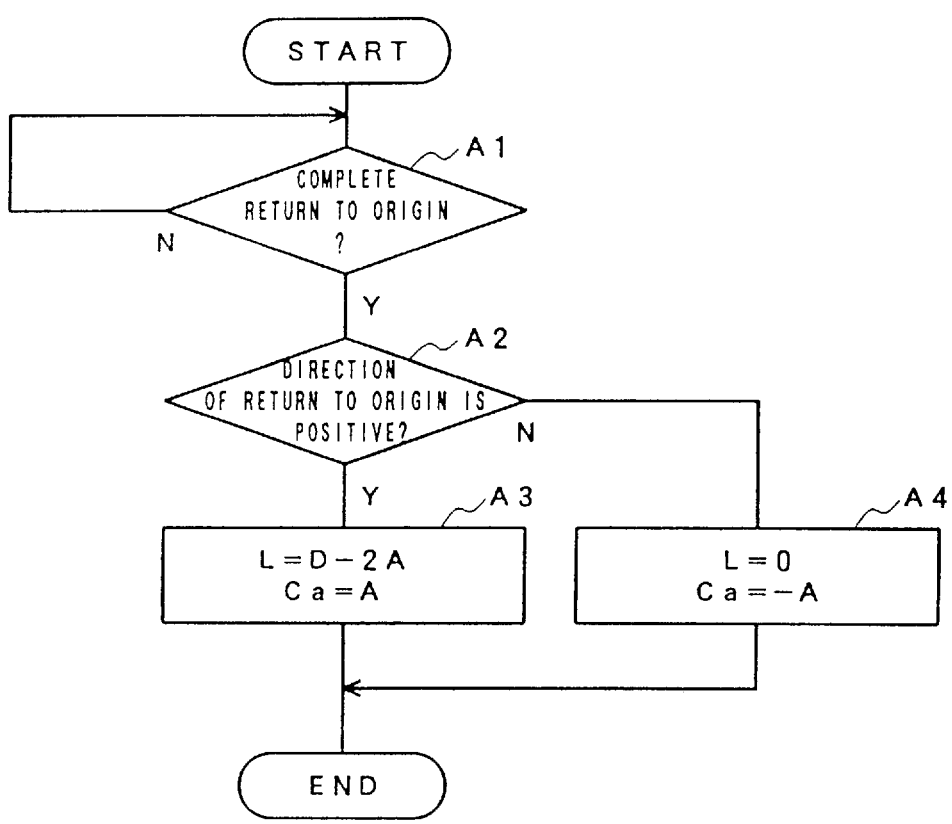
FIG. 7 is a flow chart schematically showing an initialization processing in a first embodiment of the present invention.
Figure 8:
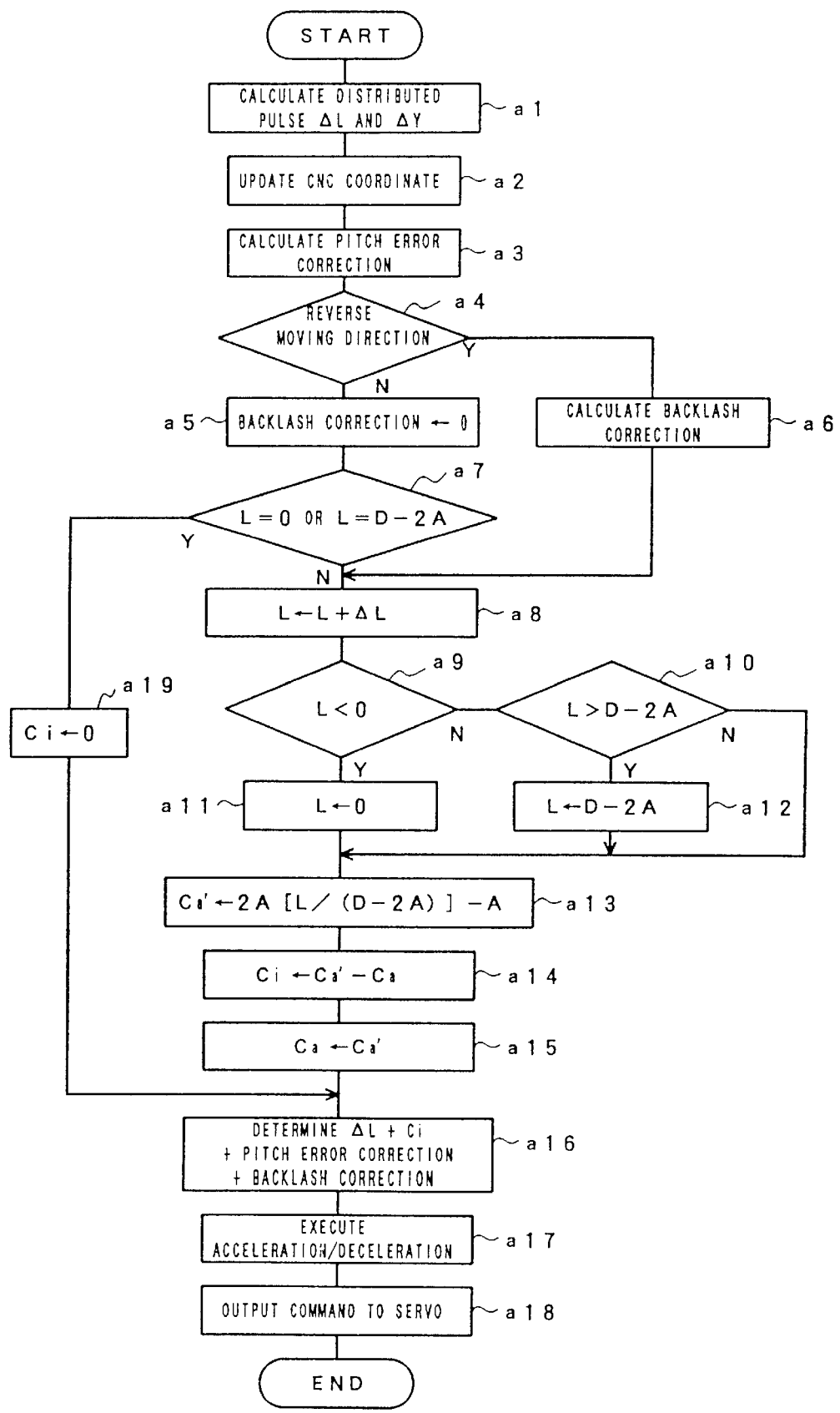
FIG. 8 is a flow chart schematically showing a correction processing in the first embodiment.

With reference to FIGS. 7 and 8, here will be described the positional displacement correction to be executed by the control system 11 (the CPU 19 for the CNC) of the present embodiment. FIG. 7 shows an initialization process to be executed when the machining point is returned to the mechanical origin, and FIG. 8 shows a correction to be executed at each pulse distribution period.

In the present embodiment, the initialization and the correction are executed only for the movement in the direction of X-axis where the deflection is liable to occur in the workpiece drive unit; however, with the structure in which the deflection in the Y-axis direction has to be considered, the processings similar to the following ones are also performed for the Y-axis by determining the maximum deflection Ay in the Y-axis direction and the movement Dy corresponding to the accumulated deflection.

For returning to the origin, a command therefor is given in the state where the movement to the origin is large enough to exceed (D−2A). As shown in FIG. 7, the CNC CPU 19, which has outputted the command for return to the origin to the X axis servo motor Mx, stands by (at Step A1) until the servo motor Mx returns to the mechanical origin. The CPU 19 determines (at Step A2) whether the moving direction to return to the origin is positive or negative. When the moving direction to the origin is positive, i.e., the movement in the +X direction, as illustrated in FIG. 3, the CNC CPU 19 sets the maximum correction +A in the correction storage register Ca and (D−2A) in the moving position storage register L for storing the position L of the reversed correction sections 0 to (D 2A), and feeds the servo motor Mx further by +A (at Step A3) to establish the coincidence between the commanded position and the position of the actual machining point. When the moving direction to the origin is negative, i.e., the movement in the −X direction, as illustrated in FIG. 3, the CPU 19 sets −A in the correction storage register Ca and 0 in the moving position storage register L, and feeds the servo motor Mx further by −A (at Step A4) to establish the coincidence between the commanded position and the position of the actual machining point. Incidentally, this feed of +A or −A after returning to the origin is unnecessary when the moving action is controlled in terms of an increment.

In short the correction storage register Ca is a register for storing the present value of the corrected value Ca' and is set with the correction value +A, when the moving direction to the origin is positive to cause a delay in the negative direction, and with the correction valve −A, when the moving direction to the origin is negative to cause a delay in the positive direction.

At the end of the initialization described above, the machining programs or the like is executed to start the drive controls on the individual axes so that the CNC CPU 19 executes the corrections, as shown in FIG. 8, for each pulse distribution period.

The CNC CPU 19, as having started the correction, executes the pulse distribution similar to that of the prior art on the basis of the machining program or the like to determine the distributed pulse number ΔL in the X direction (at Step a1). These values are added to the present position storage register of each axis to update the values of the register of each axis (at Step a2). As in the prior art, the pitch error correction of the feed screw is determined (at Step a3). Naturally, the distributed pulse number ΔL are given signs, i.e., the positive signs for the movement in the +X direction and the negative signs for the movement in the −X direction.

Next, the CNC CPU 19 determines (at Step a4) whether or not the moving direction on the X axis is inverted. If there has been no reversal of the moving direction, the register for storing the backlash correction of the power transmission line is set to 0 (at Step a5). It is then determined (at Step a7) whether or not the value L of the movement storage register for storing the moving position after reversal can satisfy that L=0 or L=D−2A, that is, whether or not the machining point is moving in the reversed movement section requiring the correction for the delay. As is clear from FIG. 3 and FIG. 6, the reversed movement section requiring the delay correction lies within the range of $0 \leq L \leq (D-2A)$. However, when the machining point is moving continuously in the same direction while the workpiece drive unit is already subjected to a maximum deflection $|A|$, for example, as shown in FIG. 4 and FIG. 5, during the movement in +X direction or −X direction, through which the correction value Ca' becomes +A or −A, the value L of the movement storage register is held to 0 or D−2A, so that, when the result of determination at Step a7 is true, this means that the machining point is moving in the same direction with the workpiece drive unit already subjected to a maximum deflection +A or −A, and thus the correction value Ca' need not be changed. In this case, the correction value Ca' is necessarily at +A or −A. Thus, the CNC CPU 19: sets the incremental correction amount Ci for each pulse distribution period to 0 (at Step a19); determines the movement command to be outputted to the servo motor Mx for the period (at Step a16), by adding the distributed pulse number ΔL in the X direction, as determined at Step a1, the incremental correction 0, as set at Step a9, the pitch error correction, as determined at Step a3, and the backlash correction 0, as set at Step a5; executes the acceleration/deceleration like that of the prior art; and outputs this movement command to the servo control circuit 12 (at Step a18).

When the machining point is moved, after returning to the origin in the +X direction, the determination at Step a4 is false and that the determination at Step a7 is true for L=D−2A (with reference to Step A3 of the initialization), so that the value of the incremental correction amount Ci for each pulse distribution period is held at 0. This also applies to the case where the machining point is moved, after the origin restoration, in the −X direction.

(1) Reversal of Movements from −X direction to +X direction:

When the machining point is moved in the +X direction after the origin restoration in the −X direction, or when the movement is made in the +X direction after the movement in the −X direction beyond the correction section, L=0 and Ca=−A at Step A4 and at later-described Steps a9, a11 and a15. When the reversal in the moving direction is detected at Step a4, the backlash correction of the power transmission line is determined (at Step a6) as in the prior art. Then, the distributed pulse number ΔL (ΔL>0), as determined at Step a1, are added to the moving position storage register L, and it is decided (at Steps a9 and a10) whether or not the position L of the correction section or the value of the moving position storage register L is smaller than "0" or larger than (D−2A). When the correction section falls within 0<L<(D−2A), the calculation of Formula (1) is executed to determine the correction value Ca' corresponding to the Position L of the correction section (at Step a13).

Then, from the value (an absolute amount) of the correction value storage register Ca the determined correction value Ca' (in an absolute amount) is subtracted to determine the incremental correction amount Ci (at Step a14) to be outputted to the servo motor Mx for that period. Then, the correction value Ca' is stored in the correction value storage register Ca (at Step a15) and is updated and stored.

Next, the CNC CPU 19 determines the movement command (at Step a16) to be outputted to the servo motor Mx for the period, by adding the distributed pulse number ΔL in the X direction, as determined at Step a1, the incremental correction amount Ci, as determined at aforementioned 14, the pitch error correction, as determined at Step a3. and the backlash correction, as set at Step a6, executes the acceleration/deceleration similar to that of the prior art, and outputs this movement command to the servo control circuit 12 (at Step a18).

From the next period, the operations of Steps a1 to a4 are executed. Since the moving direction is not reversed, processing proceeds from Step a4 skips to Step a5, where the backlash correction is set to "0". It is determined at Step a7 whether or not the value of the moving position storage register L is at "0" or (D−2A). When the result of determination is false to indicate the correction section, the foregoing processings of Steps a8 to a18 are executed. From that point on, this processing is executed for each period, and the incremental correction amount Ci for each period is added to the distributed pulse number ΔL so that the correction value Ca' (an absolute value) according to the position L of the correction period is corrected with respect to the moving position.

When it is detected, at Step a10, during the executions of the operations of Steps a1 to a5 and a7 to a18 for each period, that the value of the moving position storage register L exceeds (D−2A), this value (D−2A) is latched in the moving position storage register L so that the position L of The correction section is limited to (D−2A), and the processing proceeds to Step a13. When the value of the moving position storage register L, as determined at Step a8, is at (D−2A), the routine transfers from Step a10 to Step a13. That is, when the correction section (D−2A) is passed, the position L of the correction section is limited to (D−2A), and the correction value Ca' is obtained at Step a13. In this case, L=D−2A, so that Ca'=A, and the incremental correction amount Ci takes the value (at Step a14) which is obtained by subtracting the correction value, as determined for the preceding period to be stored in the register Ca, from that correction A. Moreover, this correction value A is stored in the correction value storage register Ca (at Step a15), and the processings of the aforementioned Steps a16 to a18 are executed.

From the next period, L=D−2A, the routine transfers from Step a7 to Step a19 so long as the moving direction is not reversed. The correction (Ci=0) to the deflection of the workpiece drive unit is not executed, and the pitch error correction is added to the distributed pulse number ΔL to make the movement command (at Steps a16 to a18) to the servo motor Mx. As a result, while the moving direction is not reversed but continues in the +X direction, the processings of Steps a8 to a15 will not be executed, so that L=D−2A and Ca=+A are continued.

(2) Reversal of Movements from +X direction to −X direction:

When the machining point is moved in the −X direction after returning to the origin in the +X direction or when the movement is made in the −X direction after the movement in the +X direction passing the correction section, as described in the aforementioned case (1), L=D−2A and Ca=+A at Step A3 and at aforementioned Steps a10, a12 and a15 will be set. When the reversal of the moving direction is detected at Step a4, the backlash correction of the power transmission line is determined (at Step a6) as in the prior art. Then, the distributed pulse number ΔL (ΔL>0), as determined at Step a1, is added to the moving position storage register L. to determine the position L of the correction section (at Step a8) thereby to execute the aforementioned processings of Steps a9 to a18.

From that point on, the processings of Steps a1 to a5 and a7 to a18 are executed until the value of the moving position storage register L becomes 0. In this case, the distributed pulse number ΔL, as determined at Step a1, is of negative value, so that the value of the moving position storage register L gradually reduces for each period. For instance, the correction value Ca' (and the value of the register Ca), as determined at Step a13, gradually reduces from the initial value +A, and the incremental correction amount Ci turns negative (at Step a14). The negative correction amount Ci is sequentially added to the movement command to the servo motor Mx (at Step a16), thereby sequentially correcting the delay of the machining point. When it is detected at Step a9 that the value "0" is exceeded (although the routine transfers through Step a10 to Step a13 when the value L, as determined at Step a8, is "0"), the routine transfers to Step a11, at which the value "0" is stored in the moving position storage register L. On the basis of this value, the correction value Ca' Is determined (Ca'=−A), and the incremental correction amount Ci or the difference between the correction values at this time and the preceding time is determined (at Step a14). The correction value Ca' (=−A) is stored in the register Ca so that the aforementioned processings of Steps a16 to a18 can be executed.

From the next period, L=0, so that the routine transfers from Step a7 to Step a19 so long as the moving direction is not recessed. The correction (Ci=0) to the deflection of the workpiece drive unit will not be executed, but the pitch error correction is added to the distributed pulse number ΔL to make the movement command to the servo motor Mx (at Steps a16 to a18). As a result, while the movement is continued in the −X direction without its direction being reversed, the processings of Steps a8 to a15 are not executed to retain L=0 and Ca=−A.

(3) Reversal during Movement in Correction Sections 0 to (D−2A).

As described above, the moving position storage register L is stored with the position L of the correction section, and the correction storage register Ca is stored with the correction value which has already been corrected. When the reversal of the moving direction is detected, the position of the correction section to be moved by the output of this period is determined at Step a8 by adding the distribution pulse number ΔL, as determined at step a1, to the position of the correction section stored in the moving position storage register L. The correction value Ca' corresponding to this position is determined at Step a13, and the incremental correction amount Ci is determined by subtracting the correction value up to the preceding period, as stored in the correction value storage register Ca, from the correction value Ca'. This correction amount Ci and the distributed pulse number ΔL are added to be outputted.

In this way, the correction value (in an absolute value) corresponding to the position of the correction section is stored, so that the correction value (i.e., the value of Ca) at the time of the reversal of the direction can be acquired. Thus, the correction amount Ci of the present period can be determined by that correction value Ca and the correction value Ca', determined by the position L of the correction section. The subsequent processings are identical with those which are executed in the foregoing cases (1) and (2).

In the embodiment thus far described, on the basis of the position L of the correction section after the start of the reversed movement, the correction value Ca' for the position is determined, and the incremental correction amount Ci to be outputted for the present period is determined as the difference from the correction value determined for the preceding period. However, the incremental correction amount Ci can also be calculated directly on the basis of the distributed pulse number ΔL in the X direction for that processing period.

In FIG. 6, the incremental correction amount Ci for the distributed pulse number ΔL can be determined by the following Formula (3):

$$Ci=[2A/(D-2A)]\cdot \Delta L \qquad (3).$$

The distributed pulse amount ΔL has a sign, so that the incremental correction amount Ci also has a sign. These incremental correction amounts Ci may be summed, and correction processing is discontinued, when the summation becomes +A in the case of the movement in the +X direction, whereas the correction processing is discontinued when the summation of the incremental correction amounts Ci becomes −A in the case of the movement in the −X direction.

The processing operations of these cases will be briefly described with reference to FIGS. 9 and 10.

Figure 9:
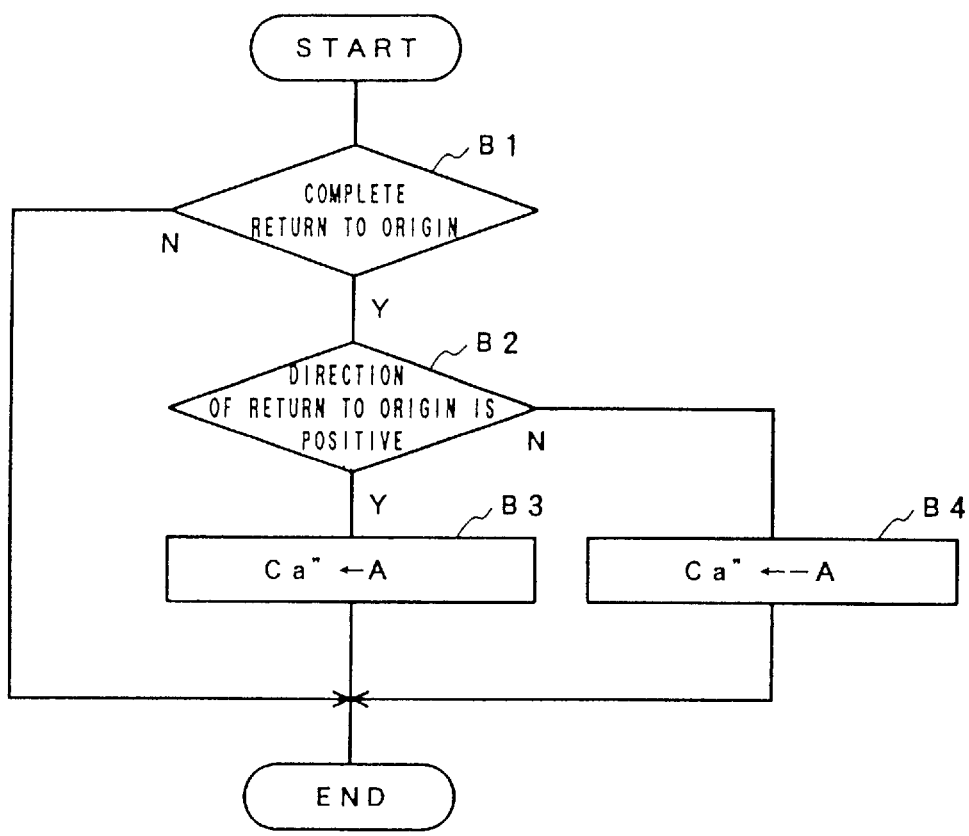
FIG. 9 is a flow chart schematically showing an initialization processing in a second embodiment of the present invention.

The initialization processing, as shown in FIG. 9, is basically identical to the aforementioned one shown in FIG. 7. In this case of FIG. 9, however, the moving position storage register L is not necessary, and what is required is only to set a correction value storage register Ca" with either the initial value A (when returning to the origin in the positive direction) or the initial value −A (when returning to the origin in the negative direction) (with reference to Steps B3 and B4).

Figure 10:
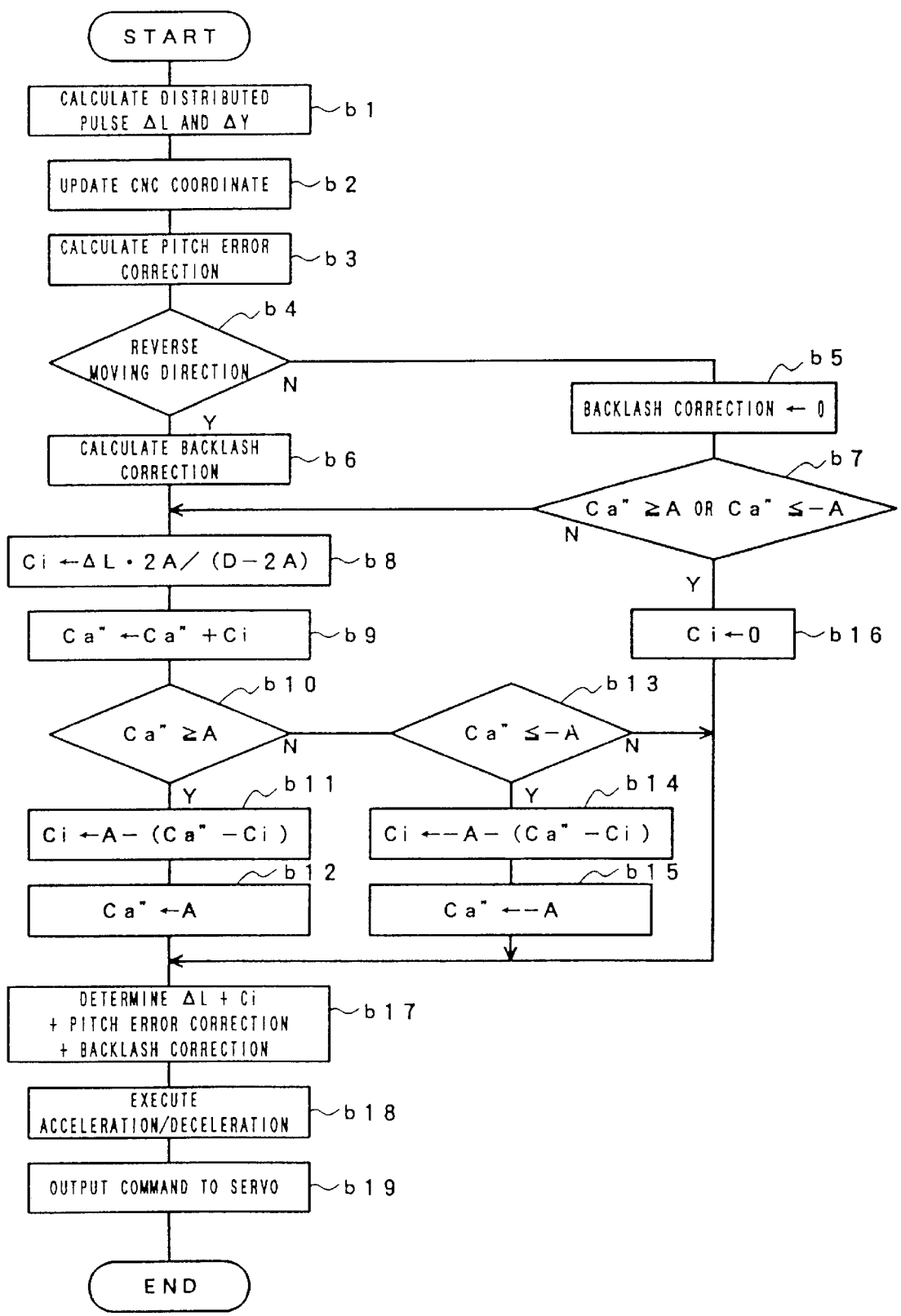
FIG. 10 is a flow chart schematically showing a correction processing in the second embodiment.

In the correction shown in FIG. 10, too, the processings or Steps b1 to b6 and Steps b17 to b19 are entirely identical to those of Steps a1 to a6 and Steps a16 to a18 for the aforementioned correction of FIG. 8.

The CNC CPU 19, having started the correction, executes the processings of Steps b1 to b3 as in the case of the aforementioned embodiment, and then determines (at Step b4) whether or not the moving direction has been reversed. When the reversal of the moving direction has not been made, the CNC CPU 19 sets the backlash correction value to 0 (at Step b5) and determines (at Step b7) whether or riot the value of the correction value storage register Ca" for storing the summed value of the incremental correction values Ci is |Ca"|≦A.

The determination at Step b7 is for determining whether or not the machining point is located within the correction section requiring the correction of the delay.

When |Ca"|≦A, and the machining point is not in the correction section requiring the delay correction, the CNC CPU 19 ends the processing of this period by setting the incremental correction amount Ci to "0" (at Step b16) and executing the processings of Steps b17 to b19 as in the correction shown in FIG. 8.

When the reversal of the moving direction is detected at The decision of Step b4, on the other hand, the CNC CPU 19 calculates (at Step b6) the backlash correction value as in the prior art. On the basis of the value ΔL determined at Step b1, the CNC CPU 19 determines the value of the incremental correction value Ci to be outputted to the servo motor Mx for this period, by executing the calculation of Formula (3) (at Step b8). Further, the CNC CPU 19 determines the absolute correction value at the present point by adding the correction value Ci to the correction value storage register Ca", and updates and stores (at Step b9) the determined value in the correction value storage register Ca".

When the correction section is passed in the state where the correction value Ca" at present, as calculated by the processing of Step b9, is |Ca"|≧A, the absolute correction value would exceed the maximum of the deflection of the workpiece drive unit if the value Ci were unchanged and used for the correction. When |Ca"|≧A, therefore, the CNC CPU 19 resets the incremental correction value Ci to [A−(Ca"−Ci)] and the value Ca" to A (at Steps b10 to b12). When |Ca"|≦−A, the CNC CPU 19 resets the incremental correction value Ci to [−A−(Ca"−Ci)] and the value Ca" to −A (at Steps b13 to b15).

In either case, when the value of Ci, as finally calculated at Step b11 or b14, is added to the value of Ca" before execution of Step b9, the value of Ca" becomes identical to +A or −A, and the absolute correction value is equalized to the maximum of the deflection of the workpiece drive unit. That is, the processings of Steps b10 to b12 are substitutions of the processings of Steps a10 and a12 in the correction of FIG. 8, and the processings of Steps b13 to b15 are substitutions of the processings of Steps a9 and a11 in the correction of FIG. 8.

Moreover. both the determinations in Steps b10 and b13 are false, and |Ca"|<A, and thus, the case within the correction section, it is apparent that no excessive correction will be made even when the correction is made by directly using the incremental correction value Ci determined at Step b8. Therefore, the CNC CPU 19 keeps the correction value, as determined at Step b8.

Then, the CNC CPU 19 ends the processing of this period by executing the processings of Steps b17 to b19 as in the correction shown in FIG. 8.

A brief description was made on the embodiment in which the incremental correction value Ci is directly calculated on the basis of the distributed pulses ΔL in the X direction for the processing period, and whether or not the adjustment of the correction is necessary is determined on the basis of the present value of the correction value Ca". However, operational effect of the present embodiment does not differ substantially from the first embodiment shown in FIGS. 7 and 8, though, on one hand, information on determination reference is extracted from the movement amount, on the other hand, from the correction value; and on one hand, the processing for determining the incremental correction value is based upon the absolute correction value of the present processing period and the absolute correction value of the preceding period, on the other hand, upon only the distributed pulses ΔL of this processing period.

What is claimed is:

1. A method for correcting the positional displacement of a machining point in a machine where a delay is caused by a deflections of the machine between a drive point and a machining point of a driven member to which the force of a drive source is applied, comprising the steps of:

predetermining the maximum delay of the machining point with respect to the drive point;

determining a correction path for correcting said delay in the movement of said drive point after the reversal of moving direction; and determining a correction amount for correcting said delay, on the basis of both twice the time of said maximum delay with respect to said correction path and a movement command value after the reversal of the moving direction, until the accumulation value of said correction values reaches said maximum delay, and adding said determined correction to said movement command value thereby to output the resultant value as a movement command value.

2. A method of correcting the positional displacement of a machining point in a machine where a delay is caused by a deflection of the machine between a drive point and a machining point of a driven member to which the force of a drive source is applied comprising the steps of:

predetermining the maximum delay of the machining point with respect to the drive point;

determining a correction path for correcting said delay in the movement of said drive point after the reversal of moving direction;

providing memory means for storing a first correction value corresponding to the delay;

determining, at a reversal of moving direction, a second correction value on the basis of a position in said correction path corresponding to a measured correction path, said maximum delay and a movement command value;

adding the difference between said first correction value and the second correction value, as stored in said memory means, to the movement command value thereby to output the resultant value as a movement command value;

updating and storing said second correction value in said memory means; and outputting said movement command value directly as a movement command value when the absolute value of the first correction value, as stored in said memory means, becomes equal to said maximum delay.

3. A method of correcting the positional displacement of a machining point according to claim 1, further comprising the step of:

measuring the movement path of said drive point when the delay is restored to the maximum after moving direction of the drive point is reversed from the state where the delay is at the maximum, thereby to take the measured movement path as said correction path.

4. A method of correcting the positional displacement of a machining point, comprising the steps of:

determining the maximum positional displacement A (A>0) when an actual machining point is positionally displaced by the deflection of a machine with respect to a movement command value of a CNC;

determining an increment D (D>0) of said movement command value in a second direction up to the point at which the actual positional displacement of the machining point from the point commanded by the movement command of CNC becomes equal to said maximum positional displacement A due to the deflection of the machine after said machining point having moved in a first direction, with said maximum positional displacement A, is stopped by a command and moved in the second direction opposite to said first direction in response to a movement command; and giving a correction totaling 2A to the movement command during the time period after a reversing command and before the increment of the movement command reaches (D−2A)(D−2A>0), when said machining point moving in an arbitrary direction, with said maximum positional displacement, starts to move in the direction opposite to said one direction in response to the reversing command, wherein the point at which the increment of the corrected movement command from the start of the reversed movement becomes equal to said increment D is made to coincide with the point at which the actual machining point starts to be positioned behind by a distance equal to said maximum positional displacement A in the reversed moving direction with respect to said corrected movement command.

5. A method of correcting the positional displacement of a machining point according to claim 4, wherein when the increment (D−2A) of said movement command is given by n distributions (n: an integer larger than 1) of a constant amount, the correction amount for the distributed movement command (D−2A)/n at each time is 2A/n.

6. A method of correcting the positional displacement of a machining point according to claim 4, wherein the collection of total 2A is given to said movement command during the time period before the increment of said movement command reaches (D−2A) (D−2A>0) in a manner such that:

(1) the absolute value of the correction amount is predetermined assuming that its initial value is A or −A and that it increases by a small correction increment Ci of a constant amount for each pulse distribution period ΔL after the reversal of the movement command; and (2) the actual small correction increment is added, for each pulse distribution period after the reversal of the movement command, as a value which will constitute an absolute value of correction amount, as determined at the above step (1), corresponding to the present distribution period if it is added to the absolute value of correction amount for the preceding pulse distribution period.

7. A method of correcting the positional displacement of a machining point according to claim 6, wherein while the operation of step (2) is being executed, it is checked at every pulse distribution period as to whether the reversed distribution pulses have ended the distribution of (D−2A); and as a result, processing step (2) is continued when the distribution of (D−2A) has not been made, but stopped when the distribution of (D−2A) has been made.

8. A method of correcting the positional displacement of a machining point according to claim 2, further comprising the step of:

measuring the movement path of said drive point when the delay is restored to the maximum after moving direction of the drive point is reversed from the state where the delay is at the maximum, thereby to take the measured movement path as said correction path.

9. An apparatus for correcting the positional displacement of a machining point, comprising:

a first unit determining a correction path for correcting a delay in the movement of a drive point after the reversal of a moving direction; and a second unit determining a correction amount for correcting a delay, on the basis of both twice the time of the maximum delay with respect to the correction path and a movement command value after the reversal of the moving direction, until the value of the correction value reaches the maximum delay, and adding the correction amount to the movement command value and outputting the movement command value.

10. An apparatus for correcting the positional displacement of a machining point, comprising:

a memory storing a first correction value corresponding to a delay;

a first unit determining, at a reversal of a moving direction, a second correction value on the basis of a position in a correction path corresponding to a measured correction path, a maximum delay and a movement command value; and a second unit adding the difference between the first and second correction values to the movement command value, and outputting the movement command value when the absolute value of the first correction value becomes equal to the maximum delay.

11. A method for correcting the positional displacement of a machining point, comprising the steps of:

storing a first correction value corresponding to a delay;

determining, at a reversal of a moving direction, a second correction value on the basis of a position in a correction path corresponding to a measured correction path, a maximum delay and a movement command value; and adding the difference between the first and second correction values to the movement command value, and outputting the movement command value when the absolute value of the first correction value becomes equal to the maximum delay.

* * * * *

UNITED STATES PATENT AND TRADEMARK OFFICE
CERTIFICATE OF CORRECTION

PATENT NO.    : 5,892,680
DATED         : April 6, 1999
INVENTOR(S)   : Kita et al.

It is certified that error appears in the above-identified patent and that said Letters Patent is hereby corrected as shown below:

Title page, [75], "Oshino-mura" should be --Minamitsuru--;

Col. 4,  line 1, "oil" should be --on--.
Col. 8,  line 21, delete "," after "L"
         line 22, "L=(D-21/2" should be --L=(D-2A)/2--;
         line 31, "Which" should be --which--;
         line 42, "L and L"" should be --L and L'--; and
                  "L'=(D-2A)" should be --L'=-(D-2A)--.

Col. 10, line 31, "Step a9" should be --Step a19--;
         line 61, Position" should be --position--.

Col. 11, line 32, "The" should be --the--;
Col. 12, line 23, "Is" should be --is--.

Signed and Sealed this

Twenty-third Day of November, 1999

Attest:

Q. TODD DICKINSON

*Attesting Officer*    *Acting Commissioner of Patents and Trademarks*